(12) United States Patent
Wirth, Jr. et al.

(10) Patent No.: US 6,585,459 B2
(45) Date of Patent: Jul. 1, 2003

(54) PLUG CUTTER HAVING STAGED TAPER AND/OR INTEGRATED DEPTH STOP

(75) Inventors: John Wirth, Jr., Dubois, WY (US); Jay L. Sanger, Casper, WY (US); Mark K. McCool, Casper, WY (US); Paul Brutsman, Casper, WY (US)

(73) Assignee: Woodworker's Supply Inc., Casper, WY (US)

( * ) Notice: Subject to any disclaimer, the term of this patent is extended or adjusted under 35 U.S.C. 154(b) by 6 days.

(21) Appl. No.: 10/000,353

(22) Filed: Dec. 4, 2001

(65) Prior Publication Data

US 2003/0103822 A1 Jun. 5, 2003

(51) Int. Cl.[7] ................................................. B23G 5/00
(52) U.S. Cl. ........................................................ 408/203.5
(58) Field of Search .......................... 408/203.5, 204, 408/205, 206, 703, 207

(56) References Cited

U.S. PATENT DOCUMENTS 1,494,897 A * 5/1924 Freye ........................ 408/204
2,748,817 A * 6/1956 Stearns ...................... 408/204
4,295,763 A * 10/1981 Cunniff ....................... 408/86
4,538,944 A * 9/1985 Hougen ...................... 408/206
5,213,456 A 5/1993 Lee
5,795,110 A 8/1998 Wirth, Jr. et al.
5,810,524 A 9/1998 Wirth, Jr. et al.
5,842,820 A * 12/1998 Lee et al. ................... 408/204
6,099,214 A * 8/2000 Lee et al. ................... 408/204
6,273,652 B1 8/2001 Wirth, Jr. et al.

FOREIGN PATENT DOCUMENTS

FR 2535635 * 5/1984 .............. 408/203.5

* cited by examiner

*Primary Examiner*—Daniel W. Howell
(74) *Attorney, Agent, or Firm*—Nixon & Vanderhye PC

(57) ABSTRACT

A plug cutter is provided that has a main body with a shank extending from one end and plurality of cutting blades extending from the other end. The blades have a plurality of facets defining cutting edges for cutting and shaving stock material to form a plug. The blades define an inner bore having a staged taper and a radial relief portion is provided so that a gap is defined between an outer surface of the plug being formed and the radially relieved portion of the inner surface of the blades. The plug cutter has a built-in depth stop to provide plug height repeatability and quick set up.

19 Claims, 4 Drawing Sheets

US 6,585,459 B2

PLUG CUTTER HAVING STAGED TAPER AND/OR INTEGRATED DEPTH STOP

BACKGROUND OF THE INVENTION

1. Field of the Invention

The present invention relates to a plug cutter and, more particularly, to a plug cutter having a dual taper, radial relief to minimize burning of the outer surface of the plug and to avoid premature plug breakaway, and/or a depth stop for plug height repeatability.

2. Description of the Related Art

Conventional plug cutters include a main body portion, a shank extending from one end of the main body portion, and a plurality of cutting tines, or blades, extending axially from an opposite end of the main body. The plurality of cutting blades define a bore that is circular in cross section. The configuration of the bore corresponds to the configuration of the plug produced with the plug cutter.

Typically, a plug cutter is produced by first, drilling a bore axially into a cylindrical piece of steel and, second, milling the cutting blades out of the resulting annular wall surrounding the bore. Each blade has an inner surface that faces radially inwardly toward the center of the bore.

Contact by the entire inner surface of the blades on the outer surface of the plug while the plug cutter is rotating can cause burning on the outer surface of the plug due to the heat generated by the high speed frictional contact of the inner surface of the blades with the outer surface of the plug. In addition, friction between the outer surface of the plug and the inner surfaces of the blades can cause a torque to be applied from the plug cutter to the plug, causing the plug to prematurely break away from the stock and become lodged in the bore of the plug cutter. In this case, the plug can only be removed from the plug cutter by destroying the plug. Finally, if the entire inner surface of the blades contact the outer surface of the plug, the outer surface is formed by shearing, rather than cutting, resulting in a plug having a rough outer surface.

SUMMARY OF THE INVENTION

The present invention avoids the above-described disadvantages encountered with conventional plug cutters by providing a measure of radial relief between the inner surface of the blades and the circular bore defined by the leading, cutting edges of the blades. The present invention further advantageously defines a dual taper to provide an increased taper at the top periphery of the plug to ensure snug engagement of the formed plug with the bore in which it is inserted. Furthermore, the preferred embodiment of the present invention further provides the unique advantage of an integrated depth stop in the plug cutter bore for providing the plug height repeatability and quick set-up that is highly desirable for woodworking tasks.

Therefore, according to the present invention, a plug cutter is provided that is rotatable about an axis of rotation. The plug cutter comprises a main body having a longitudinal axis coinciding with the axis of rotation, a shank coaxial with the axis of rotation extending from one end of the main body and a plurality of cutting tines or blades extending axially from the opposite end of the main body. The plurality blades are adapted to cut a plug in a piece of stock material as the plug cutter is rotated at high speed about the axis of rotation and advanced axially into the piece of stock material. In one exemplary embodiment, each blade is formed so that an inner surface thereof defines a dual taper portion adjacent and along a leading edge of the blade, with respect to the direction of rotation, and a radial relief portion downstream of the dual taper portion. The radial relief portion comprises a portion wherein the radial distance from the axis of rotation to the inner surface of the blade is greater than a radial distance to said dual tapered surfaces or to said cutting edge so that as the plug cutter is cutting a plug, substantially only the cutting edge and the dual tapered portions of each blade make contact with the outer surface of the plug. According to a further feature of an exemplary embodiment of the invention, a depth stop is defined within the bore of the plug cutter to limit the height of the plug produced, for plug reproducibility and to avoid plug jamming within the plug cutter.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
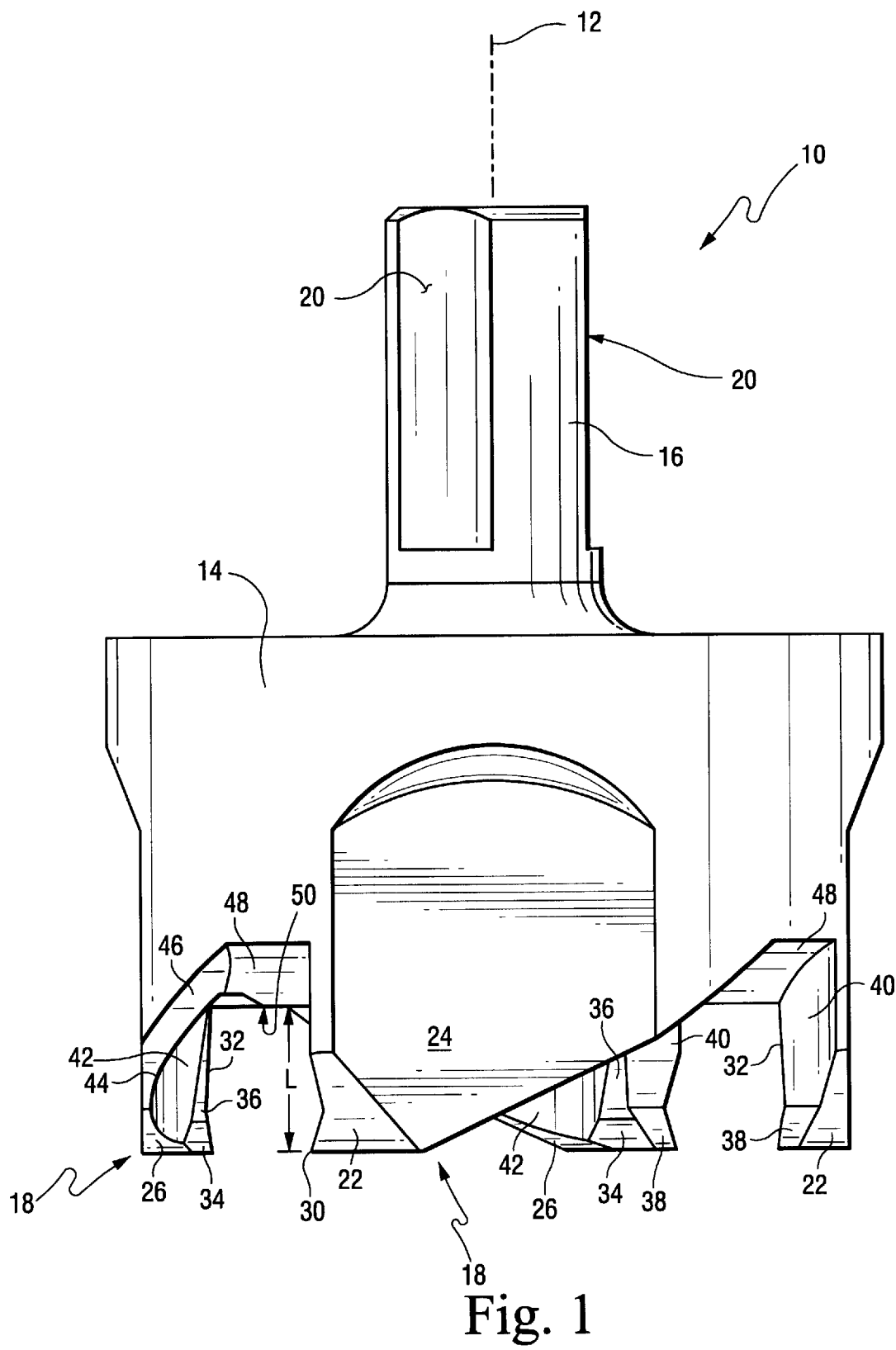
FIG. 1 is a side elevation of a plug cutter embodying the present invention.
Figure 2:
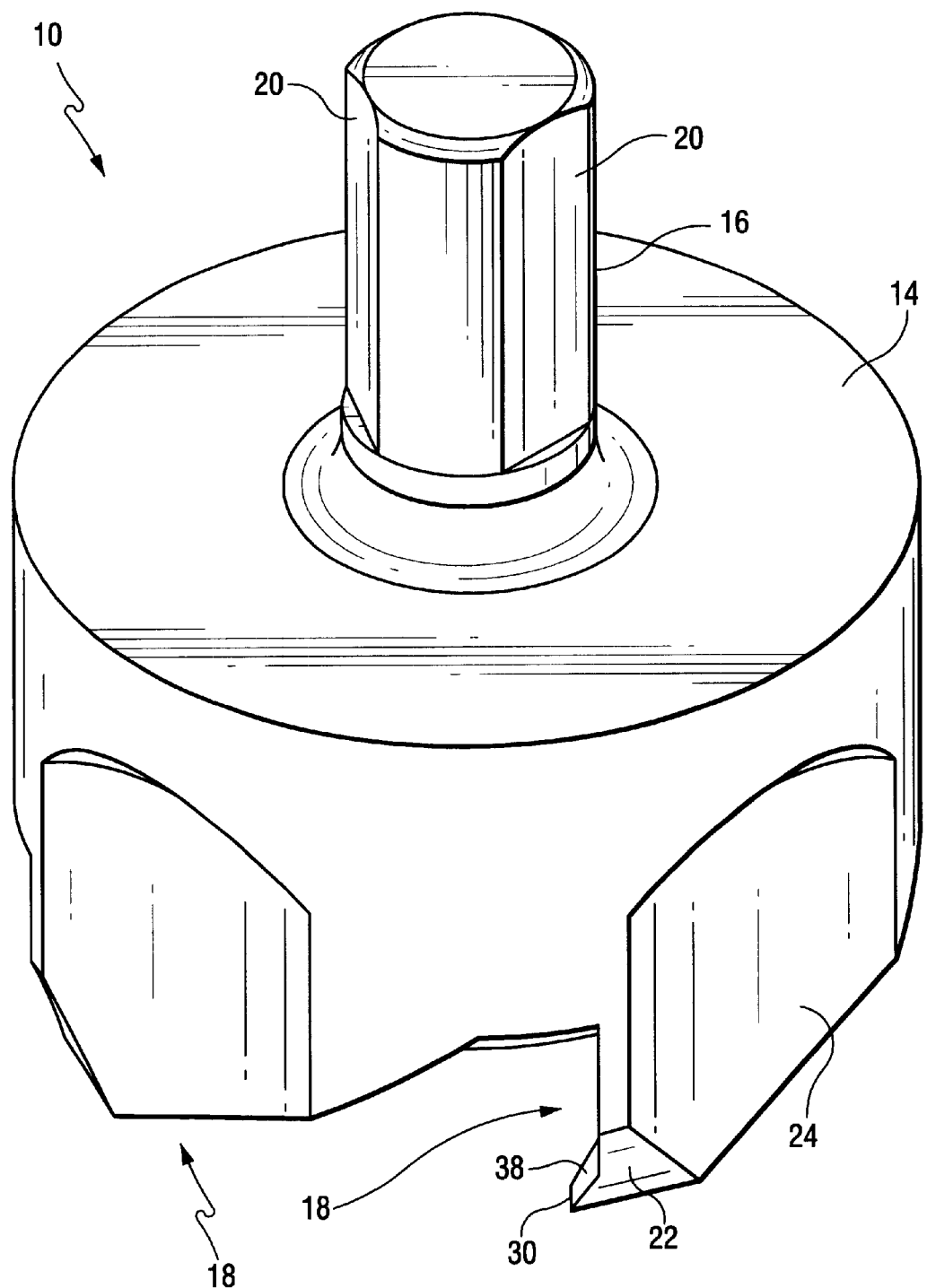
FIG. 2 is a perspective view from the shank end of the plug cutter.
Figure 3:
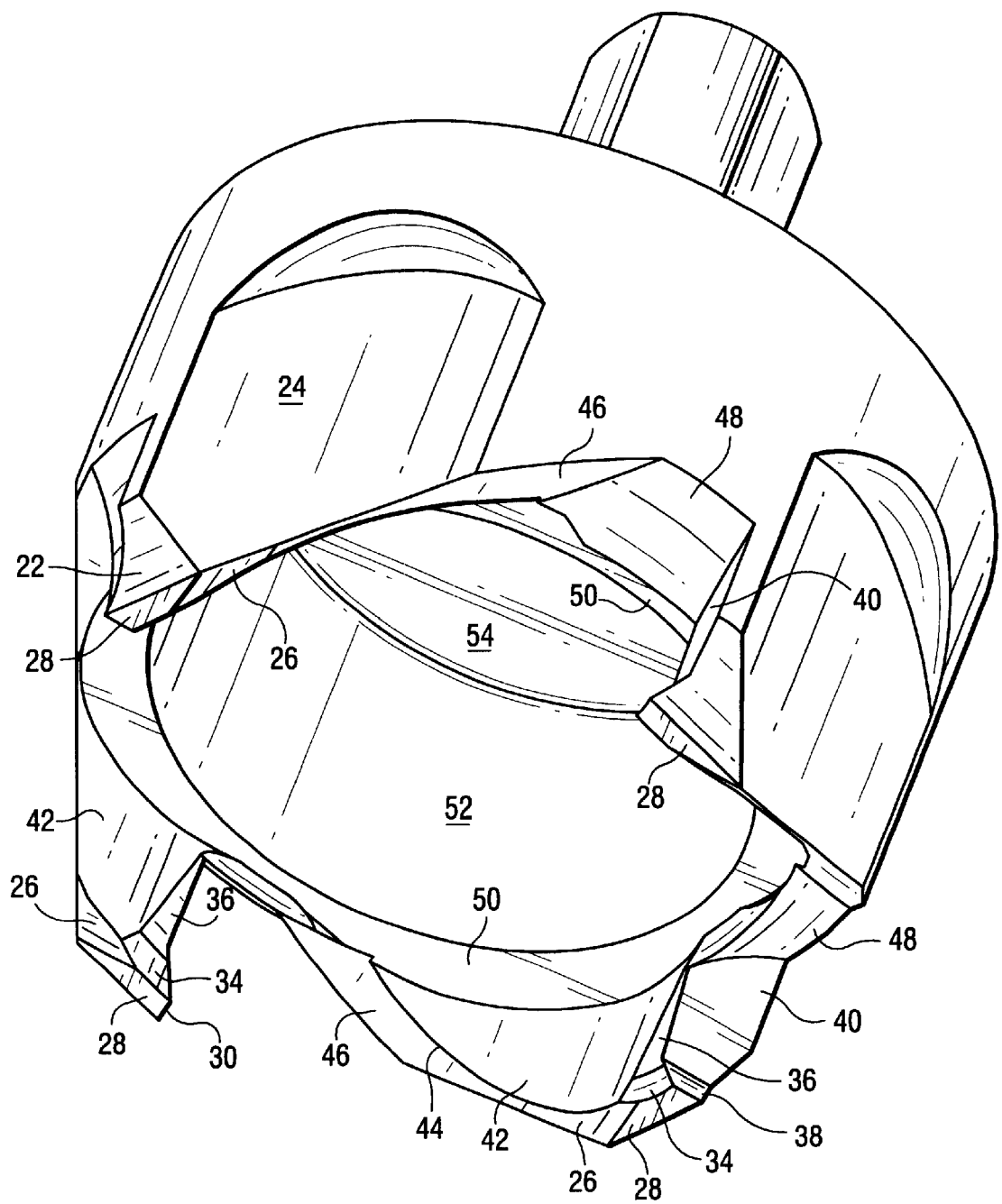
FIG. 3 is a perspective view from the blade end of the plug cutter.

A plug cutter 10 according to a presently preferred, exemplary embodiment of the invention, is shown in particular in the perspective and elevational views of FIGS. 1–3. Similar to conventional plug cutters, the plug cutter 10 has an axis of rotation 12, a main body portion 14 having a longitudinal axis which coincides with the axis of rotation 12, a shank portion 16 extending from a first end of the main body 14 and a plurality of cutting tines or blades 18 extending axially from the other end of the main body. In the illustrated embodiment, the shank 16 has a plurality of facets 20 and is adapted to fit into the jaws of the drill, (not shown) in a conventional manner. In the illustrated embodiment, four blades 18 extend from the main body 14. As an alternative, the plug cutter may be limited to three blades. The plug cutter is formed as an integrated unit, preferably from stainless steel, but other metals of suitable strength and hardness may be adopted instead.

Figure 4:
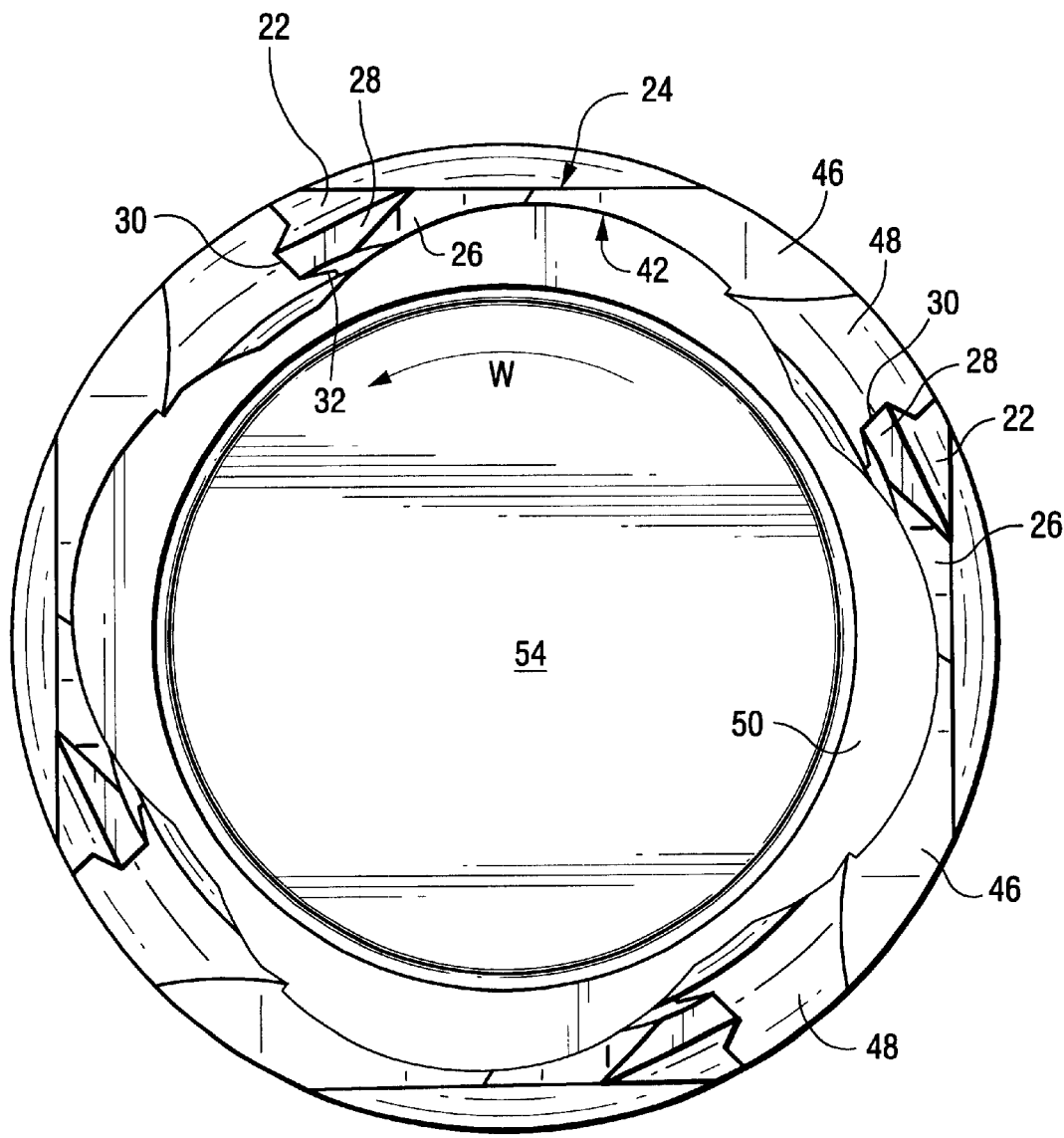
FIG. 4 is an end view of the plug cutter of FIG. 1 taken from the blade end of the plug cutter.

As shown in particular in FIGS. 1, 3 and 4, each blade is formed with a number facets, such as facets, 22, 24, 26, 28, and 46 as well as cutting edges such as tip 30. Because each blade 18 of the plug cutter 10 is identically formed, for ease of review and explanation, the corresponding facets and edges of each blade 18 are labeled with the same reference number. As shown in FIGS. 1 and 4 in facet 28 may be disposed in a horizontal plane. It is contemplated, however, that the blades 18 may be formed so that facet 28 does not lie in a horizontal plane and tip 30 is inclined or extends somewhat downwardly.

In the plug cutter of the present invention, it is presently preferred that the bore defined by the cutting blades be flared or tapered outwardly along at least a portion of the axial length of the bore so that the diameter of the plug cut by the cutting blade is smallest adjacent or near the main body and greatest at or adjacent the cutting tips 30 of the blades 18. With the blades tapered in this manner, the radius of the leading edge of the blade varies along at least a portion of the axial length of the blade. In a currently preferred embodiment, the blades are tapered along substantially their entire length but at first and second taper angles so that the base of the cut plug which will be the head of the inserted plug is enlarged with respect to the shank of the plug to enhance the tension of the plug in an associated plug hole and to provide for a mating engagement with a modestly countersunk bore configuration.

More specifically, each blade 18 has an inner surface facing generally radially inward towards the center of the bore defined by the cutting blades, that is towards the axis of rotation of the plug cutter. In an embodiment of the invention, the inner surface of each blade is defined by a plurality of surfaces commencing with and extending circumferentially from a leading edge 32 that extends from tip 30 along the axial length of the blade 18. As will be appreciated the leading edge of the cutting tip defines the forward most portion of the inner surface with respect to the direction of rotation W as shown in FIG. 4.

As noted, the leading edge 32 is a cutting edge of the cutting blade. As illustrated, the leading edge is defined in three segments defined by a dual tapered radially inner surface segment of the cutting blade and a dual faceted leading surface of the blade. More specifically, the radially inner surface includes a first portion 34 adjacent the distal tip of the blade which defines a first tapered surface and a second portion 36 proximal thereto which defines a second tapered surface that is tapered less than the first surface 34. In an exemplary embodiment, the first taper is about 12 degrees with respect to the rotational axis and the second taper is about 4 degrees with respect to the rotation axis.

The leading, cutting edge 32 is further defined by first and second facets in the leading surface of the cutting blade, leading facet 38 and trailing facet 40. As best seen in FIG. 1, facets 40 and 36 thus define a first portion of the cutting edge, facets 36 and 38 define a second portion of the cutting edge and facets 34 and 38 define a third portion of the cutting edge.

The radially inner surface of the cutting blade which trails the tapered portions 34, 36 defines a radial relief portion 42. Thus, at least portion 42 of the inner surface of the cutting blade 18 is provided with a measure of radial relief with respect to the leading edge 32 and with respect to the tapered portions 34,36 of the blade inner surface. Thus, as a plug is being cut with the plug cutter, a gap is defined between the plug being cut and the radially relieved portion 42 of the inner surface of the cutting blade. As is apparent from the illustration of FIG. 1, in the illustrated embodiment the radial relief increases gradually to a maximum value at the trailing edge 44 of the cutting blade. Facet 46 defines a transition from the trailing edge 44 to the outer surface of the blade 18 to facilitate debris removal during the cutting operation. While this is a preferred configuration, it is only necessary that a measure of radial relief be provided and the variation in radial relief from adjacent the tapered portions 34, 36 of the cutting blade to trailing edge 44 is not critical to realization of the advantages of the invention.

When a plug is being cut by a plug cutter according to the present invention, substantially only the leading edge 32 and the tapered portions 34, 36 of each blade contact the outer surface of the plug being cut while the plug cutter is rotating. This minimal contact between the blade and the plug lessens the amount of burning due to frictional heat and reduces the likelihood that the plug will break off and become lodged in the plug cutter.

According to a further feature of the invention, as best shown in FIGS. 1 and 4, a depth stop 50 is defined at a predetermined distance L from the distal tip 30 of the cutting blades 18. In this embodiment, a facet 48 defines a transition from the depth stop to the outer surface of the main body for debris removal. As illustrated in FIG. 4, the depth stop is defined about an entire circumferential periphery of the plug cutter, radially inward of the cutting blades. The depth stop 50 is limited in radial dimension to define a ring that is spaced as shown by surface 52 from the end wall 54 defined within the main body 14. Thus the depth stop engages the plug being cut about a peripheral edge thereof but not across the entire plug. As a result, a depth stop function is provided without full contact with the plug cutter main body, thus reducing the risk of burning of the tip of the plug and reducing the potential for the plug becoming wedged within the cutting blades of the plug cutter.

Thus, but for the depth stop 50, a plug of a greater height than predetermined distance L would be form ed by the cutting blades 18. However, the presence of the depth stop 50 truncates the plug cutting process before the plug extends into the receptacle defined by surfaces 52 and 54.

As shown by surfaces 46, 48, the cutting blades actually extend axially a length greater than the predetermined length L defined by the depth stop 50, and the receptacle defined by surfaces 52 and 54 could accommodate a plug having a height greater than length L.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A plug cutter rotatable about an axis of rotation, comprising:

a main body having a longitudinal axis coinciding with said axis of rotation;

a shank extending axially from one end of said main body, concentrically with said axis of rotation; and a plurality of cutting blades extending axially from an opposite end of said main body and terminating in a distal end, each of said blades having a leading edge and an inner surface facing generally radially inwardly, said plurality of blades being adapted to cut a plug in a piece of stock as said main body is rotated about said axis of rotation and advanced axially of the piece of stock, wherein said plurality of cutting blades are constructed and arranged so that when said main body is rotated, said plurality of blades define a bore that is tapered along at least a portion of the length thereof in at least first and second stages, at least first and second angles, respectively, such that a radial distance between said leading edge and said axis of rotation is greater adjacent said distal end than adjacent said main body, said first stage of said taper being defined adjacent said distal end and said second stage of said taper being defined proximal of the first stage, and said first angle of said first stage of said taper differing from said second angle of said second stage of said taper, each said angle being greater than zero with respect to said longitudinal axis.

2. The plug cutter of claim 1, wherein there are four said cutting blades.

3. The plug cutter of claim 1, wherein said distal end of each said blade defines a cutting tip.

4. The plug cutter of claim 1, wherein said plurality of cutting blades are constructed and arranged so that when said plug cutter is rotated, said plurality of cutting blades define a bore that is tapered along an entire axial length of said bore.

5. The plug cutter of claim 1, wherein at least a portion of said inner surface of each said blade is radially relieved with respect to the leading edge thereof so that as a plug is being cut by said blades, a gap is defined between an outer surface of the plug being cut and said radially relieved portion.

6. The plug cutter of claim 5, wherein as the plug cutter is cutting the plug, substantially only the leading edge of each blade is in contact with the outer surface of the plug.

7. The plug cutter of claim 1, wherein said plug cutter is formed of stainless steel.

8. The plug cutter of claim 1, further comprising a depth stop defined at a predetermined distance from the distal end of the blades to limit a height of the plug being cut.

9. The plug cutter of claim 8, wherein the depth stop is defined about an entire circumferential periphery of the main body, radially inward of the blades.

10. The plug cutter of claim 8, wherein the depth stop is defined radially inward of the blades and axially spaced from an end wall of the bore so as to engage substantially only a peripheral edge of the plug being cut.

11. A plug cutter rotatable about an axis of rotation, comprising:

a main body having a longitudinal axis coinciding with said axis of rotation;

a shank extending axially from one end of said main body, concentrically with said axis of rotation;

a plurality of cutting blades extending axially from an opposite end of said main body and terminating in a distal end, each of said blades having a leading edge and an inner surface facing generally radially inwardly, said plurality of cutting blades being constructed and arranged so that when said main body is rotated, said plurality of blades define a bore bounded at one end by an end wall of said main body, said plurality of blades being adapted to cut a plug in a piece of stock as said main body is rotated about said axis of rotation and advanced axially of the piece of stock; and a depth stop defined by a surface disposed at a predetermined distance from the distal ends of the blades to limit a height of the plug being cut, said depth stop being spaced axially from said end wall of the main body.

12. The plug cutter of claim 11, wherein the depth stop is defined about an entire circumferential periphery of the main body, radially inward of the blades.

13. The plug cutter of claim 11, wherein there are four said cutting blades.

14. The plug cutter of claim 11, wherein said distal end of each said blade defines a cutting tip.

15. The plug cutter of claim 11, wherein the bore defined by said cutting blades when said main body is rotated is tapered along at least a portion of the length thereof.

16. The plug cutter of claim 15, wherein the bore defined by said cutting blades when said main body is rotated is tapered along at least a portion of the length thereof in least first and second stages, at least first and second angles, respectively, such that a radial distance between said leading edge and said axis of rotation is greater adjacent said distal end than adjacent said main body, said first stage of said taper being defined adjacent said distal end and said second stage of said taper being defined proximal of the first stage, and said first angle of said first stage of said taper differing from said second angle of said second stage of said taper, each said angle being greater than zero with respect to said longitudinal axis.

17. The plug cutter of claim 15, wherein the bore defined by said cutting blades when said main body is rotated is tapered along an entire axial length thereof from said distal end to said depth stop.

18. The plug cutter of claim 11, wherein at least a portion of said inner surface of each said blade is radially relieved with respect to the leading edge thereof so that as a plug is being cut by said blades, a gap is defined between an outer surface of the plug being cut and said radially relieved portion.

19. The plug cutter of claim 11, wherein said plug cutter is formed of stainless steel.

\* \* \* \* \*